United States Patent [19]

Wüllenweber et al.

[11] Patent Number: 5,010,050

[45] Date of Patent: Apr. 23, 1991

[54] PROCESS OF PRODUCING COMPOSITE MATERIAL CONSISTING OF SHEET METAL PLATES, METAL STRIPS AND FOILS HAVING A SKELETON SURFACE STRUCTURE AND USE OF THE COMPOSITE MATERIALS

[75] Inventors: Heinz Wüllenweber, Frankfurt am Main; Peter Kohl, Neuberg; Herbert Jung, Oberursel, all of Fed. Rep. of Germany; Jürgen Borchardt, Troistorrents, Switzerland; Wolfgang Bickle, Reilingen; Jürgen Braus, Walldorf, both of Fed. Rep. of Germany

[73] Assignee: Metallgesellschaft AG, Frankfurt am Main, Fed. Rep. of Germany

[21] Appl. No.: 339,746

[22] Filed: Apr. 18, 1989

[30] Foreign Application Priority Data

Apr. 23, 1988 [DE] Fed. Rep. of Germany ....... 3813744

[51] Int. Cl.$^5$ ............................................. B01J 25/00
[52] U.S. Cl. ........................................ 502/301; 419/3; 419/8; 419/43; 419/50; 419/57; 419/69; 502/326; 502/344
[58] Field of Search ..................... 419/3, 8, 43, 50, 57, 419/60, 69; 502/301, 326, 344

[56] References Cited

U.S. PATENT DOCUMENTS

| | | | |
|---|---|---|---|
| 3,073,697 | 1/1963 | Friese et al. | 419/48 |
| 3,108,871 | 10/1963 | Storchheim | 419/8 |
| 3,150,011 | 9/1964 | Winsel et al. | 204/38.4 |
| 3,179,516 | 4/1965 | Cross | 419/32 |
| 3,481,789 | 12/1969 | Winsel et al. | 429/45 |
| 4,278,568 | 7/1981 | Lehrberg et al. | 502/301 |
| 4,670,214 | 6/1987 | Magnuson et al. | 419/3 |

*Primary Examiner*—Brooks H. Hunt
*Assistant Examiner*—Ngoclan T. Mai
*Attorney, Agent, or Firm*—Spring Horn Kramer & Woods

[57] ABSTRACT

In a process of producing composite materials consisting of sheet metal plates, metal strips and foils and provided with a skeleton surface structure, a layer of a metal powder which is difficultly flowable and consists of irregularly shaped particles is applied to a continuously moved metallic carrier layer and is bonded to said carrier layer by cold roll cladding and is sintered in a reducing atmosphere at temperatures of 600° to 1000° C. In order to produce composite materials in which the skeleton structure constitutes a layer that is of uniform thickness throughout the surface and is firmly bonded to the carrier layer, the metal powder is uniformly distributed and applied as regards its bulk volume using a distributing roller, which rotates opposite to the main direction of movement of the carrier layer, whereby a uniform thickness is obtained.

14 Claims, 1 Drawing Sheet

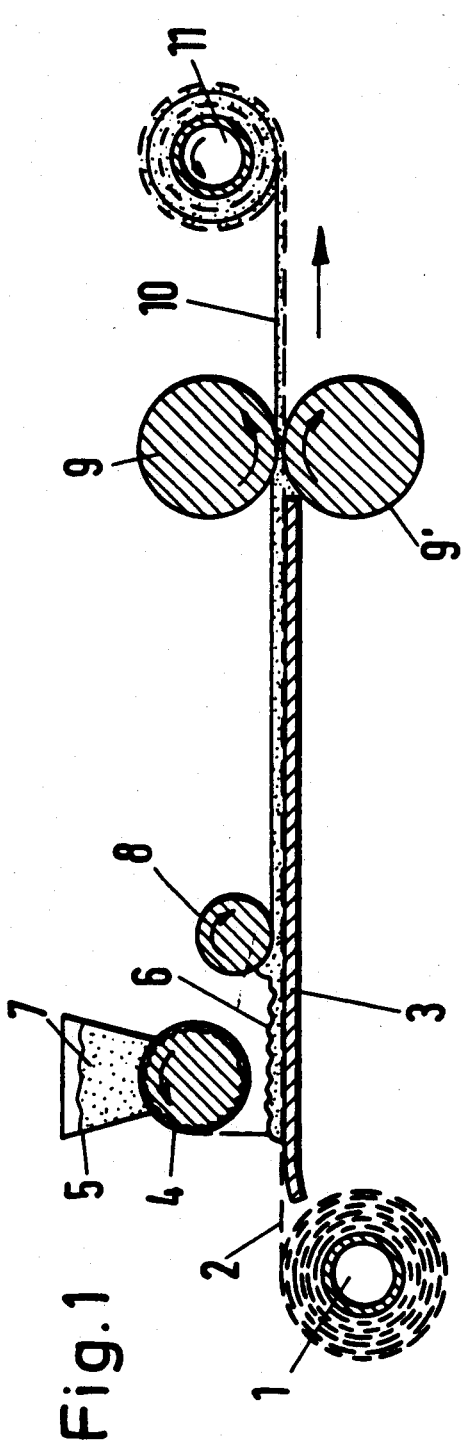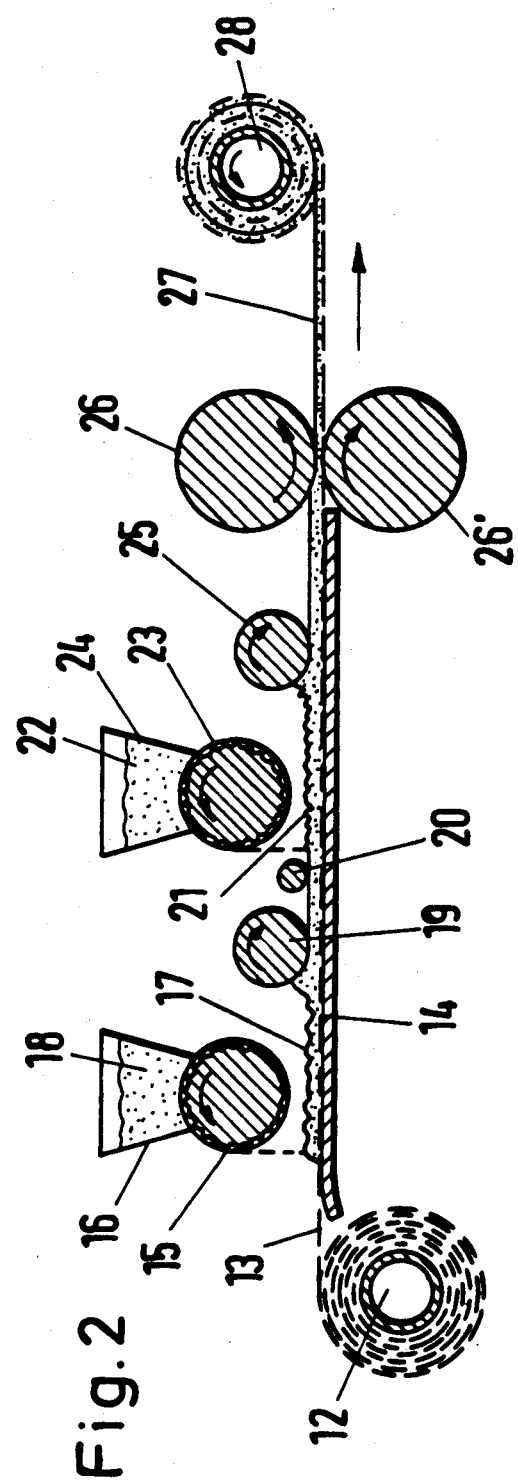

PROCESS OF PRODUCING COMPOSITE MATERIAL CONSISTING OF SHEET METAL PLATES, METAL STRIPS AND FOILS HAVING A SKELETON SURFACE STRUCTURE AND USE OF THE COMPOSITE MATERIALS

BACKGROUND OF THE INVENTION

This invention relates to a process of producing composite materials consisting of sheet metal plates, metal strips and foils having a thickness of ≦5 mm, preferably 0.15 to 3.0 mm, and having a skeleton surface structure in a thickness of 1.0 to 500 μm, preferably 5.0 to 150 μm, which in its open pores contains or is adapted to contain catalyst material, wherein a layer of a difficultly flowable materials powder which is intended to constitute the skeleton structure and consists of irregularly shaped particles in a size of 0.1 to 10 μm, preferably of iron, nickel, silver or cobalt material, is applied to a surface-forming pretreated metallic carrier layer, which preferably consists of iron, copper or nickel material and is continuously moved relative to the powder being dispensed, and said powder is bonded to the carrier layer by a cold roll cladding, by which the carrier layer is simultaneously deformed by 20 to 60%, and the metal powder is then sintered in a reducing atmosphere at temperatures of 600° to 1000° C., preferably 700° to 800° C., with a holding time of 10 to 45 minutes, preferably 15 minutes. The invention relates also to the use of the composite materials.

In accordance with Austrian Patent Specification No. 206,867 and German Patent Specification No. 12 33 834, a mixture consisting of a pulverulent material for forming the skeleton structure and of pulverulent Raney alloy is applied to the surface of a compact or porous shaped metallic element which serves as a carrier and the mixture is pressed or rolled onto the carrier and is sintered in a reducing atmosphere at temperatures above 400° C. and preferably above 600° C. and finally the soluble component of the Raney alloy is dissolved out. Besides, the Raney alloy may be pressed or rolled into the open pores of the sintered skeleton structure and may be sintered at temperatures above 400° C. The soluble component can be dissolved out of the Raney alloy in known manner. The most important representative of the Raney alloys is Raney nickel, which is made from a nickel-aluminum alloy that contains about 50% nickel. A Raney nickel catalyst electrode of high activity contains 90 to 97% nickel and about 4 to 8% aluminum. That process will be advantageous if the mixture is consolidated on the shaped element by a pressing operation. Under the pressing or rolling pressures applied, which are of an order of magnitude of about 1000 kg/cm², only double skeleton electrodes having a relatively small surface area can be manufactured with a reasonably small technical expenditure. The consolidation of the mixture on non-apertured metallic surfaces which would permit a production of double-skeleton electrodes having a large surface area can be carried out only with difficulty because the mixture is displaced from the metallic surface by the pressing or rolling operation with the result that extremely thin skeleton structure layers of restricted utility can be produced, at best.

Investigating whether known processes of powder metallurgy or of steel-shaping technology can be used in the production of electrodes provided with a catalyst which contains Raney nickel have resulted in a process in which, in accordance with European Patent Specification No. 0 009 830, a mixture of a skeleton-forming pulverulent material and of a pulverulent Raney alloy, in a ratio of 1:3 to 3:1, is applied in the form of a spreadable paste in a water-alcohol mixture and a binder, such as starch, is applied to a starting sheet metal element or strip that consists of iron, steel, nickel or copper and has a roughened surface. When the applied layer has dried the sheet metal element or strip is moved through a cold-rolling mill and the width of the roll nip is so adjusted that the deformation of the sheet element or strip in one shaping stage is 20 to 60%. The sheet metal element or strip is clad with the powder mixture as the sheet metal element or strip is deformed. This is succeeded by a short-time annealing in a reducing atmosphere at temperatures above 600° C., e.g., for 30 minutes, whereby the irregularly shaped particles of the skeleton-forming metal powder are welded so that the potentially catalytic particles of the Raney alloy are retained in cages of the skeleton-forming metal. The thickness of the powder layer is so selected that a skeleton structure layer in a thickness of 10 to 300 μm is obtained. But that process has found only restricted application thus far for the production of electrodes provided with a double skeleton-catalyst layer because it can be used only to make electrodes having a relatively large thickness, e.g., in excess of 2 mm, which owing to their irregular thickness and an insufficiently strong bond to the carrier layer cannot be used for various applications in which a good workability in subsequent operations such as embossing, bending, stamping, is required.

SUMMARY OF THE INVENTION

It is an object of the present invention so to improve the process described first hereinbefore for the production of composite materials having a skeleton surface structure that the skeleton structure constitutes a layer of uniform thickness throughout the surface and firmly adheres to the carrier layer and can be made to have a comparatively large surface area and a small thickness and that this can be accomplished with a minimized expenditure.

That object is accomplished in that the powder for forming the skeleton structure is uniformly distributed and applied as regards its bulk volume and the powder layer is moved under a distributing roller, which rotates oppositely to the main direction of movement of the carrier layer, whereby a uniform thickness is obtained. This will result in a composite material in which the skeleton structure constitutes a layer of uniform thickness and is bonded to the carrier layer with an excellent bond strength. Besides, a uniform rolling pressure can be applied during cold rolling.

The carrier layer is suitably constituted by optionally apertured sheet metal plates or strip or by wire nets or expanded metal and the powder is applied to such carrier layer at such a rate that a layer having a thickness of 0.25 to 1.75 mm, preferably 0.75 to 1.25 mm, will be constituted by the powder layer when it has been moved under the distributing roller which rotates opposite to the main direction of movement.

In special cases the powder layer on the carrier layer may flow during transportation and/or cold roll cladding. Such flow can be prevented in accordance with a further feature of the process in accordance with the invention in that the powder layer is spray-coated with an adhesive lacquer or is slightly precompacted by rolling or pressing when the carrier layer has been moved under the distributing roller which rotates oppositely to the main direction of movement of the carrier layer.

If the composite materials are to be subjected to relatively high loads, the strength of the bond between the skeleton structure and the carrier layer can substantially be improved in that, in accordance with a further feature of the invention, an interlayer consisting of a metal powder, preferably of iron, cobalt, nickel, lead, silver or copper material, is uniformly distributed and applied as regards its bulk volume to the carrier layer which is continuously moved relative to the powder being dispensed and that interlayer is applied to the carrier layer before the application of the powder for forming the skeleton powder and is subsequently moved under a distributing roll which rotates opposite to the main direction of movement of the carrier layer. The powder layer for forming the skeleton structure is then applied to said interlayer and during the cold roll cladding is forced into the interlayer to such a depth that an intimate bond between said two layers is obtained.

The sintered composite material will behave like a soft-anneal sheet metal. The hardness and thickness of said material may optionally be controlled within relatively wide limits by a subsequent cold rolling in one or more steps.

The thickness and the porosity of the composite material will influence its lateral electrical conductance, i.e., its electrical conductance parallel to its surface. A high lateral conductance will be of high importance when the composite materials are used as electrodes, e.g., in electrolysis plants, because the electric current will always flow over contact points and/or lines from the metallic structure of the cells into the electrodes and will be distributed in the electrodes in directions which are parallel to the surfaces of the electrodes. If the contact points and/or lines are closely spaced apart and the lateral conductance is high, i.e., the electrodes have a low resistance, that distribution will not involve an appreciable dissipation of energy. For this reason the dissipation of energy can be influenced within relatively wide limits by the selection of the density and thickness of the skeleton structure.

The composite materials produced by the process in accordance with the invention can easily be processed further by cutting, embossing, bending, stamping or similar operations even if the brittle skeleton structure tears it will not detach from the carrier layer.

It has been found that particularly in the production of wide composite materials the use of a star wheel feeder will be particularly desirable for the uniform distribution and application of the powder as regards its bulk volume to the carrier layer or to the primer.

In a preferred embodiment of the process in accordance with the invention in that a mixture of a metal powder, preferably of a carbonyl nickel powder, for forming the skeleton structure, and of a pulverulent Raney alloy, which serves as a catalyst, in mixing ratio of 1:3 to 3:1, is applied to the carrier or on the primer interlayer and the soluble component is adapted to be dissolved out of the mixture in order to activate the catalyst. The soluble component of the catalyst is dissolved out in order to activate the catalyst.

In another embodiment of the process in accordance with the invention the skeleton structure is impregnated with the catalyst material when the skeleton structure has been sintered and optionally subjected to a subsequent rolling.

In order to increase the strength of the bond between the powder layer and the carrier layer, the powder layer which has been moved under the distributing roller is desirably moved under an additional distributing roller which rotates opposite to the main direction of movement of the carrier layer.

The invention is similarly applicable also to the production of composite materials consisting of a carrier layer that is coated with a skeleton structure on both sides.

The composite materials produced by the process in accordance with the invention are preferably used as electrodes in electrolytic and fuel cells or as catalytically active shaped elements, such as coils of embossed sheet metal, in chemical processes.

For a continuous production of the composite materials a striplike carrier layer being unwound from a drum may continuously be moved under one or more star wheel feeders and under at least one distributing roller, which moves opposite to the main direction of movement, and between two cladding rollers, and the composite material thus obtained may be wound on a drum.

The invention is illustrated by way of example on the drawing and will be explained more fully hereinafter.

BRIEF DESCRIPTION OF THE DRAWINGS

FIGS. 1 and 2 are cross-sectional schematic drawings of an apparatus for carrying out the process according to the invention.

DETAILED DESCRIPTION OF THE INVENTION

In accordance with FIG. 1 the nickel strip 2 which has a thickness of 3 mm and has been straightened, degreased, roughened and cleaned is unwound from the drum 1 and is pulled over the stationary support 3. By means of the star wheel feeder 4, a layer 6 consisting of a mixture of carbonyl nickel powder and of stabilized Raney nickel powder 7 composed of 42% aluminum, 7.5% molybdenum and 0.5% titanium, balance nickel, which mixture comes from the supply bin 5, is uniformly distributed over and applied to the nickel strip 2 by the star wheel feeder 4 and is subsequently moved under the distributing roller 8, which rotates opposite to the main direction of movement of the nickel plate 2 so that the powder layer 6 is given a uniform thickness of 0.9 mm. Between the two succeeding rolls 9, 9' the powder layer is cold-clad onto the nickel plate 2 and the nickel plate 2 is deformed by 47.4% so that the composite material 10 having a total thickness of 2.0 mm is obtained, in which the nickel skeleton structure which contains the Raney nickel catalyst has a thickness of 0.15 mm. The composite material 10 is wound up on the drum 11. The wound-up composite material 10 is then annealed under reducing conditions under a protective gas at a temperature of about 700° C. for 15 minutes. The bond between the nickel skeleton structure and the nickel plate 2 had a measured bond strength of $4N/mm^2$. In order to activate the electrode, the aluminum is dissolved out of the Raney nickel alloy by means of 25% potassium hydroxide solution.

In accordance with FIG. 2 a strip consisting of a nickel wire net having a thickness of 0.25 mm and a mesh opening size of 0.2 mm and a wire thickness of 0.125 mm is unwound from the drum 12 and is continuously pulled over the stationary support 14 and a layer 17 consisting of nickel powder 18 and supplied from the supply bin is uniformly distributed over and applied to the strip 13 on the support 14 by means of the star wheel feeder 15. By means of the distributing roller 19 rotating opposite to the main direction of movement of the nickel wire net, the nickel powder layer 17 is brought to a uniform thickness of 0.25 mm. The nickel powder layer 17 is subsequently slightly precompacted by the succeeding roller 20. A layer 21 formed of a mixture 22 consisting of 50% Raney nickel powder and 50% carbonyl nickel powder and coming from the supply bin 24 is uniformly distributed over and applied to that precompacted nickel powder layer 17 by means of the star wheel feeder 23 and the powder layer 21 is subsequently moved under the distributing roller 25, which rotates opposite to the main direction of movement, so that a layer having a uniform thickness of 0.8 mm is formed. The powder layer 21 is then cold roll-clad onto the nickel net 13 by the pair of rolls 26, 26' to form a composite material 27 having a total thickness of 0.5 mm. The composite material 27 is wound up on the drum 28 and the composite material 28 is subsequently annealed in a reducing atmosphere at a temperature of 700° C. for 15 minutes. In order to activate the electrode, the aluminum is dissolved out of the Raney nickel alloy by means of a 25% potassium hydroxide solution.

Electrodes having a large surface area can easily be made at low cost from the composite material that has been made by the process in accordance with the invention and such electrodes can also be processed at low cost. By means of shape rolls or similarly acting tools, the composite materials can easily be profiled and/or formed with apertures.

What is claimed is:

1. In a process of producing composite materials consisting of sheet metal plates, metal strips and foils having a thickness of ≦5 mm, and having a skeleton surface structure in a thickness of 1.0 to 400 μm containing catalyst material, comprises: applying a layer of a difficulty flowable material powder which is intended to constitute the skeleton structure and consists of irregular shaped particles in a size of 0.1 to 10 μm, to a surface-forming pretreated metallic carrier layer, continuously moving the carrier layer relative to the powder being dispensed, bonding said powder to the carrier layer by a cold roll cladding by which the carrier layer is simultaneously deformed by 20 to 60%, and sintering the metal powder in a reducing atmosphere at temperatures of 600° to 1000° C. with a holding time of 10 to 45 minutes, the improvement comprising uniformly distributing and applying the powder as regards its bulk volume by moving the powder layer under a distributing roller which rotates opposite to the main direction of movement of the carrier layer and directly contacting the powder on the carrier layer with the distributing roller without deforming to effect a uniform thickness of the powder on the carrier layer before the cold roll cladding.

2. A process according to claim 1, wherein the carrier layer comprises one of apertured sheet metal plates, sheet metal strips, of wire nets and expanded metal.

3. A process according to claim 1, wherein the powder layer which has been moved under the distributing roller has a thickness of 0.25 to 1.75 mm.

4. A process according to claim 1, wherein the powder layer is sprayed-coated with an adhesive lacquer.

5. A process according to claim 1, wherein the powder layer is precompacted by rolling or pressing.

6. A process according to claim 1, wherein a primer layer of a metal powder which consists of an iron, cobalt, nickel, lead, silver or copper material is applied in a uniform distribution as regards its bulk volume to the carrier layer as it is continuously moved relative to the powder being dispensed and the primer powder is moved under a distributing roller which rotates oppositely to the main direction of movement of the carrier layer.

7. A process according to claim 1, wherein the sintered composite material is subsequently cold-rolled.

8. A process according to claim 1, wherein the powder is distributed and applied by means of a star wheel feeder.

9. A process according to claim 1, wherein a mixture of a carbonyl nickel powder, for forming the skeleton structure, and of a pulverulent Raney alloy, which serves as the catalyst material, in a mixing ratio of 1.3 to 3:1, is bonded to the carrier layer, which as been provided with a primer, and the soluble component of the Raney alloy is dissolved out of the mixture in order to activate the catalyst.

10. A process according to claim 1, wherein the skeleton structure having an open pore structure is impregnated with the catalyst material.

11. A process according to claim 1, wherein the powder layer which has been moved under the distributing roller is moved under an additional distributing roller which rotates opposite to the main direction of movement of the carrier layer.

12. A process according to claim 1, wherein the carrier layer is coated with a skeleton structure on both sides.

13. An electrode for an electrolytic or fuel cell comprising the composite materials produced by the process claimed in claim 1.

14. A catalytically active shaped element for chemical processes comprising the composite materials produced by the process as claimed in claim 1.

* * * * *